3,418,267
FLAME-RESISTANT POLYAMIDES AND PROCESS THEREOF
Warren F. Busse, Wilmington, Del., assignor to E. I. du Pont de Nemours and Company, Wilmington, Del., a corporation of Delaware
No Drawing. Filed Sept. 1, 1965, Ser. No. 484,463
5 Claims. (Cl. 260—33.8)

ABSTRACT OF THE DISCLOSURE

Polyamide resin is made flame retardant by incorporating therein from 5 to 20 percent by weight of an organic halide, e.g., chlorinated biphenyl, which is reactive with the resin only at its pyrolysis temperature and from 3 to 15 percent by weight of an oxide of tin, lead, copper, iron, zinc or antimony.

---

This invention relates to flame-retardant compositions of polyamides.

Polyamides, i.e. polymers consisting essentially of the polycarbonamide group in the main polymer chain, are rated as self-extinguishing according to the horizontal bar flammability test of ASTM D–635. In this test, a bar is held horizontally over a screen, and a flame is applied to the end of the bar. The heat melts the polyamide and then ignites the surface of the molten polymer. The melting point of polyamides is from 180° C. to about 250° C., with the molten polymer forming a low viscosity liquid. When this liquid is further heated to about 400–450° C., it pyrolyzes to volatile flammable products which are ignited by the flame. The large difference between the melting point and the ignition temperature, coupled with the low viscosity of their melt, permit the molten polyamide to drip off the bar, carrying the flame with it. The burning droplets may fall on the screen, and be extinguished due to the heat conduction of the screen. The polyamide then receives a rating of "self-extinguishing." However, under some conditions, the liquid droplets can continue to burn, thus spreading the fire.

An increase in the melt viscosity of the polyamide, making the burning liquid drip off the bar more slowly, would increase the apparent flammability of the polyamide. Likewise, changing the shape of the polymer to a thin film coated on a metal sheet or wire, will retard the flow of the melt and make the polyamide appear to be more flammable. This effect is particularly important in electrical applications.

Prior art attempts to increase the flame resistance of polyamides have generally been unsuccessful because of the chemical character of the polymer. The carbonamide linkages in the polymer chain are considerably more reactive than many other polymer linkages such as those of polyolefins, particularly at fabrication temperatures such as 180–280° C. Thus, known fire retardant agents react with the polymer to cause severe degradation. Such well-known fire-retarding agents as halophosphates and the combination of chlorinated paraffin, containing from about 50–80% chlorine, plus antimony oxide not only fail to reduce the flammability of the polymer but react with polyamides at processing temperatures to have the opposite effect of catalyzing the pyrolysis of the polymer and lowering its ignition temperature. Even non-combustible fillers such as asbestos and silica have this effect on the polymer. In addition, commonly employed halide and phosphate retardants decrease the melt viscosity of the polyamide to increase its tendency to drip. Thus, the problem of the flammability of polyamides and a need for its solution still remains.

It has now been discovered that the fire-retardant ability of polyamides are enhanced by the incorporation therein of a combination of agents which do not deleteriously affect the properties of the polyamide after its processing and which greatly alleviates the dripping problem. This combination of fire-retarding agents consists of (a) an organic halide which is substantially non-reactive with the polyamide except at temperatures above 300° C. and preferably except at the pyrolysis temperature of the polyamide and (b) at least one oxide of certain metals. The stable non-reactive organic halides have relatively little to no catalytic effect in promoting pyrolysis as do the prior art paraffin halides, for example. The use of the non-reactive organic halide alone, however, does not reduce flammability of the polyamide and may increase its tendency to drip when ignited. Certain metal oxides must also be present in the polyamide before improvement in both aspects is obtained. The certain metal oxides used together with the non-reactive organic halide react with the polyamide at its pyrolysis temperature to form a char. This char has several beneficial effects; namely, it is relatively slow burning as compared to the polyamide itself, it shields the polyamide from direct contact of the flame, and it prevents dripping of flaming molten droplets of the polymer.

The oxides which have been found to be effective are $SnO$, $SnO_2$, $PbO$, $Cu_2O$, $Fe_2O_3$, $ZnO$, and $Sb_2O_3$. Generally from 3–15% of metal oxide based on the total weight of the composition can be employed to give beneficial results.

Examples of the non-reactive organic halides include the stable cycloaliphatic halides and the stable aryl halides with the chlorides of each being preferred. The organic halides are preferably substituted with halogen only but other substituents can be present so long as they do not interfere with the fire-retardant effect of the halide when coupled with the metal oxide. The cycloaliphatic halides include $C_{10}Cl_{12}$ (Dechlorane), chlorendic acid, and chlorendic anhydride. The aryl halides include mono-nuclear compounds such as pentabromophenol and poly-nuclear compounds such as chlorinated biphenyl containing greater than about 50% by wt. of chlorine and naphthalene containing at least 50% by wt. of chlorine, such as the Halowaxes 1001, 1006, 1013, 1014, and 1051. The poly-nuclear aromatic halides containing from 50 to 80% chlorine are preferred for the higher melting polyamides such as 66 nylon which is processed at 240–280° C. while the remaining organic halides are preferably used with the lower melting polyamides such as 610 nylon and 66/610/6 nylon which are processed at as low as about 180° C. From 5 to 20% of organic halide based on the total weight of the composition will give beneficial results. The exact amount of metal oxide and organic halide employed will depend on such variables as the particular polyamide metal oxide and organic halide being used. The generally effective amounts of each fire-retardant agent are included by the weight percent ranges given.

The polyamides which are useful in the improved fire-retardant compositions of the present invention include any of the well-known molding resins, such as those disclosed in U.S. Pat. Nos. 2,071,250, 2,071,251, 2,130,523, and 2,130,948. Preferred polyamides are polycaprolactam (6 nylon); the polyamides which are derived from the condensation of a dicarboxylic acid with a diamine, such as polyhexamethylene adipamide (66 nylon) and polyhexamethylene sebacamide (610 nylon); and copolymers thereof which may be designated as 66/610/6 nylon, 66/610 nylon, 66/6 nylon, and the like. The resin should not contain ingredients which catalyze the decomposition by other mechanism to thereby promote combustibility. However, with due regard for this requirement, the resin can be compounded with stabilizing, coloring, or modifying agents such as antioxidants, pigments, and reinforcing materials.

The polyamide and flame-retardant agents can be compounded to form an intimate mixture by any of the well-known methods and machines available. Minimum processing time at elevated temperature and the use of dry ingredients are preferred in order to minimize the chance of reaction between the organic halide and the polyamide. The ingredients can be blended in the dry form and then extruded or milled and molded to the desired shape. The fire-retardant agents can also be incorporated into the molten polymer as it is synthesized if the temperatures are such that the organic halide does not react with the polymers. In order to avoid oxidation of the polymer during any heating step, it is preferred that such heating can be carried out in an inert atmosphere. The blends of fire-detardant agents and polyamide can be fabricated into a wide variety of useful articles such as are presently available through the use of polyamide molding resins, including wire coating and films and molded and extruded shapes. The resultant article has reduced flammability.

In the case of polycaprolactam, the metal oxide only can be present in the polymer as cast, and the cast article can then be impregnated with organic halide. For example, caprolactam is polymerized according to known procedures with ZnO being added to the polymerziation mass so as to provide about 15% by wt. ZnO in the polymer, which is then soaked in refluxing tetrachloroethylene containing Halowax 1051 (octachloronaphthalene) for at least one hour. The solvent is then evaporated from the polymer. When exposed to a flame, the resultant polymer chars instead of dripping and is self-extinguishing when the heating flame is taken away. Both the halide and the oxide can be incorporated in polycarbolactam molding powder, which is then milled or molded to the desired shape.

The following examples are illustrative of the present invention. Parts and percents are by weight unless otherwise indicated.

EXAMPLE 1

20 gm. of finely divided, dry SnO+20 gm. of dry powdered Halowax 1006 (a mixture of penta and hexa-chloro naphthalene, with 63% chlorine) are dry blended with 160 gm. of 66 nylon (−80 mesh) and injection molded into ½″ x ⅛″ x 5″ bars. The injection molding machine is a 1″ diameter machine equipped with a rotating torpedo. A melt temperature of ca. 280° C. is used. The molded bars exhibit considerable toughness as evidenced by a test bar surviving 19 blends of 180°.

This bar is tested by the ADTM D–635 flammability test. It does not melt or drip, but rather it charred and is self-extinguishing.

As a more severe test, a vertical bar is ignited at the bottom for 15 sec. with a Bunsen flame. The flame on the bar extinguishes just a few seconds after the Bunsen flame is removed.

When subjected to the same vertical bar test, a control bar without the SnO+Halowax melts and the molten polymer burns until the burning drops fall off.

EXAMPLE 2

When the vertical bar test is run with 10% PbO added to 66 nylon in the manner of Example 1, the flame causes the bar to drip out, even though some char was formed. If 10% Halowax 1006 is added to the 66 nylon, the bar also drips, with some flame quenching from the halide. If both the 10% PbO and the 10% Halowax 1006 are added to the nylon, the bar chars, and does not drip, and the flame is rapidly self-extinguishing, i.e. in less than 5 sec.

EXAMPLE 3

When the vertical bar test is run with 5% pentabromo-phenol+5% PbO added to 66 nylon, the bars form a char, without any dripping, and the residual flame extinguishes in about 10 sec. without propagating over the area not heated by the Bunsen flame.

EXAMPLE 4

In a similar test 10% $SnO_2$+10% Archlor 1268 (chlorinated biphenyl-68% chlorine) are dry blended with 80% of −80 mesh 66 nylon and mixed in a 1″ injection molding machine equipped with a rotating torpedo. ½″ x ⅛″ x 5″ bars are injection molded. The bars, when tested by the vertical ignition test, exhibit a brief residual flame which rapidly extinguishes by what appears to be a combination of charring and quenching the flame.

EXAMPLE 5

140 gm. of −80 mesh "Zytel" 61 (a 6/66/610 terpolymer) are dried and blended with 40 gm. of Dechlorane ($C_{10}Cl_{12}$) and 20 gm. $Sb_2O_3$ and injection molded as above but with a melt temperature of 185° C. The opaque bars were very tough, allowing more than 50–180° blends before breaking. On the vertical bar flammability test, the burning bar extinguishes almost immediately after removing the Bunsen flame and considerable char is formed.

A control bar, i.e. without aromatic halide or $Sb_2O_3$, on the same test melts; and, the melt burns until it drips off.

EXAMPLES 6–20

The following compositions are prepared according to the procedure of Example 1 and subjected to the vertical bar flammability test.

| Example | Nylon type | Organic Halide | Wt. percent | Oxide | Wt. percent | Temp., °C. |
|---|---|---|---|---|---|---|
| 6 | 66 | Arochlor 1268 | 10 | $Fe_2O_3$ | 10 | 280 |
| 7 | 66 | Halowax 1051 [1] | 5 | $Cu_2O$ | 3 | 280 |
| 8 | 61 | $C_{10}Cl_{12}$ | 10 | $Sb_2O_3$ | 5 | 185 |
| 9 | 61 | Chlorendic anhydride | 5 | $Sb_2O_3$ | 5 | 185 |
| 10 | 66 | Halowax 1014 [2] | 5 | PbO | 5 | 265 |
| 11 | 66 | do | 5 | $SnO_2$ | 5 | 260 |
| 12 | 66 | do | 5 | SnO | 5 | 265 |
| 13 | 66 | Halowax 1006 | 15 | ZnO | 15 | 285 |
| 14 | 66 | Halowax 1001 [3] | 15 | SnO | 15 | 285 |
| 15 | 66 | do | 15 | ZnO | 15 | 285 |
| 16 | 66 | Arochlor 1268 | 15 | ZnO | 15 | 285 |
| 17 | 66 | do | 10 | PbO | 10 | 285 |
| 18 | 66 | do | 10 | SnO | 10 | 285 |
| 19 | 66 | $C_{10}Cl_{12}$ | 10 | ZnO | 10 | 270 |
| 20 | 61 | $C_{10}Cl_{12}$ | 10 | {$Sb_2O_3$ / $Sb_2O_3$} | {5 / 10} | 185 |
| 21 | 61 | $C_{10}Cl_{12}$ | 10 | PbO | 5 | 185 |

[1] Octachloronaphthalene.
[2] Mixture of penta- and hexa-chloronaphthalene.
[3] Mixture of tri- and tetra-chloronaphthalene.

In each of these examples, the test bars char under a hot Bunsen flame and are self-extinguishing when the flame is removed.

As many apparently widely different embodiments of this invention may be made without departing from the spirit and scope thereof, it is to be understood that this invention is not limited to the specific embodiments thereof except as defined in the appended claims.

What is claimed is:

1. A flame-retardant composition consisting essentially of polyamide and from 5–20% of the total weight of an organic halide which is substantially non-reactive with said polyamide except at its pyrolysis temperature and from 3–15% by weight of PbO.

2. The fire-retardant molding composition of claim 1 wherein said organic halide is an aryl halide.

3. The fire-retardant molding composition of claim 2 wherein said aryl halide contains at least two aromatic nucleii and from 50–80% by weight of chlorine.

4. The flame-retardant molding composition of claim 1 wherein said polyamide is polyhexamethylene adipamide.

5. A flame-retardant molding composition consisting essentially of polyhexamethylene adipamide and effective fire-retardant amounts of an organic halide which is substantially non-reactive with said polyhexamethylene adipamide except at its pyrolysis temperature and PbO.

References Cited

UNITED STATES PATENTS

| | | | |
|---|---|---|---|
| 2,216,835 | 10/1940 | Carothers | 260—33.8 |
| 2,461,538 | 2/1949 | Fischer | 260 |
| 2,550,650 | 4/1951 | Arnold | 260—33.8 |
| 2,669,521 | 2/1954 | Bierly | 260 |
| 2,924,532 | 2/1960 | Dereich | 260 |

MORRIS LIEBMAN, *Primary Examiner.*

R. BARON, *Assistant Examiner.*

U.S. Cl. X.R.

106—15; 260—37, 45.75